(12) United States Patent
Chen et al.

(10) Patent No.: US 12,514,951 B2
(45) Date of Patent: Jan. 6, 2026

(54) SANITIZATION APPARATUS FOR A VEHICLE USING ULTRAVIOLET LIGHT

(71) Applicant: Ford Global Technologies, LLC, Dearborn, MI (US)

(72) Inventors: Jay Z. Chen, Sylvania, OH (US); Nicholas Andrew Mazzocchi, Ypsilanti, MI (US); Jeffrey William DeMunnik, Ypsilanti, MI (US); Clay Wesley Maranville, Ypsilanti, MI (US); John Wayne Jaranson, Dearborn, MI (US); Pramita Mitra, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 861 days.

(21) Appl. No.: 17/850,751

(22) Filed: Jun. 27, 2022

(65) Prior Publication Data
US 2023/0414820 A1   Dec. 28, 2023

(51) Int. Cl.
*A61L 9/20* (2006.01)

(52) U.S. Cl.
CPC ..................... *A61L 9/20* (2013.01)

(58) Field of Classification Search
CPC ................. A61L 2/10; A61L 9/20; A61L 2/20
See application file for complete search history.

(56) References Cited

U.S. PATENT DOCUMENTS

| | | | |
|---|---|---|---|
| 6,908,597 B2 | 6/2005 | Chen et al. | |
| 9,592,312 B2 | 3/2017 | Lyslo et al. | |
| 10,155,057 B2 | 12/2018 | Rizzone | |
| 10,376,605 B1 | 8/2019 | Majdali et al. | |
| 2002/0098109 A1 | 7/2002 | Nelson et al. | |
| 2007/0053188 A1 | 3/2007 | New et al. | |
| 2007/0207066 A1 | 9/2007 | Thur et al. | |
| 2008/0175761 A1 | 7/2008 | Thur et al. | |
| 2008/0199354 A1* | 8/2008 | Gordon | A61L 2/10 422/186.3 |
| 2010/0237649 A1 | 9/2010 | Concina | |
| 2016/0000951 A1 | 1/2016 | Kreiner et al. | |
| 2016/0089459 A1 | 3/2016 | Boodaghians et al. | |

(Continued)

FOREIGN PATENT DOCUMENTS

| | | |
|---|---|---|
| CN | 2726973 Y | 9/2005 |
| DE | 102016215247 A1 | 2/2018 |

(Continued)

*Primary Examiner* — Brian W Cohen
*Assistant Examiner* — Nathanael Jason Downes
(74) *Attorney, Agent, or Firm* — Vichit Chea; Price Heneveld LLP

(57) ABSTRACT

A sanitization apparatus of a vehicle includes (i) surfaces defining a chamber configured to accept an object to be sterilized with ultraviolet light and (ii) a first light emitting diode (LED) including a die that is configured to emit ultraviolet light. The die has a primary surface that defines a plane that extends through the chamber. The sanitization apparatus further includes a first reflective surface that is reflective of ultraviolet light disposed adjacent to the first LED. At least a portion of the ultraviolet light that the die emits reflects off of the first reflective surface and into the chamber. The first reflective surface defines a plane that intersects with the plane that the primary surface of the die defines.

20 Claims, 11 Drawing Sheets

(56) References Cited

U.S. PATENT DOCUMENTS

2016/0250362 A1    9/2016  Mackin
2017/0313278 A1   11/2017  Marew
2018/0065126 A1    3/2018  Abate et al.
2022/0031885 A1*   2/2022  Yang .......................... A61L 2/10

FOREIGN PATENT DOCUMENTS

DE      102018002328 A1    9/2019
EP           2668964 A1   12/2013
JP           2005130994 A   5/2005
JP           2011073617 A   4/2011
KR            0124687 Y1   8/1998

* cited by examiner

SANITIZATION APPARATUS FOR A VEHICLE USING ULTRAVIOLET LIGHT

FIELD OF THE DISCLOSURE

The present disclosure generally relates to a sanitization apparatus for a vehicle that utilizes ultraviolet light to sanitize an object.

BACKGROUND OF THE DISCLOSURE

A sanitization apparatus can utilize emission of ultraviolet light to sanitize an object placed in the sanitization apparatus. For example, a user might place a smartphone within the sanitization apparatus for sanitization. However, there is a problem in that the sanitization apparatus typically emits ultraviolet light that impinges upon the object unequally across a surface area of the object. In other words, the sanitization apparatus may produce "hot spots" of ultraviolet light upon the surface area of the object to be sanitized, with the "hot spots" typically being positioned closest to the source of the ultraviolet light. Improving this issue would be beneficial in the context of a vehicle that includes the sanitization apparatus, because some vehicles might encounter many people in a single day, such as when the vehicle is utilized for ride hailing services, and it would be beneficial to provide the many people with the opportunity to optimally sanitize many objects.

SUMMARY OF THE DISCLOSURE

The present disclosure addresses that problem with a sanitization apparatus of a vehicle that includes a reflective surface and ultraviolet light emitting light emitting diodes placed adjacent to the reflective surface. The light emitting diodes emit the ultraviolet light not directly onto an object to be sanitized but, rather, generally parallel to the reflective surface. The reflective surface diffuses the emitted ultraviolet light before impinging upon the object. The result is a reduction or limitation of ultraviolet light impinging upon the object at areas of relatively high intensity.

According to a first aspect of the present disclosure, a sanitization apparatus of a vehicle comprises: (i) surfaces defining a chamber configured to accept an object to be sterilized with ultraviolet light; and (ii) a first light emitting diode (LED) comprising a die that is configured to emit ultraviolet light, the die comprising a primary surface that defines a plane that extends through the chamber.

Embodiments of the first aspect of the present disclosure can include any one or a combination of the following features:

the sanitization apparatus further comprises a first reflective surface that is reflective of ultraviolet light disposed adjacent to the first LED;

at least a portion of the ultraviolet light that the die emits reflects off of the first reflective surface and into the chamber;

the first reflective surface defines a plane that intersects with the plane that the primary surface of the die defines;

the plane that the first reflective surface defines is substantially perpendicular to the plane that the primary surface of the die defines;

the sanitization apparatus further comprises a floor that provides one of the surfaces that at least partially defines the chamber, the floor configured to support the object to be sterilized from below the object;

the plane that the primary surface of the die defines extends above the floor;

the sanitization apparatus further includes a second LED comprising a die that is configured to emit ultraviolet light, the die of the second LED comprising a primary surface that defines a plane that extends through the chamber;

the sanitization apparatus further includes a second reflective surface that is reflective of ultraviolet light disposed adjacent to the second LED and facing the first reflective surface;

the chamber is at least partially disposed between the first reflective surface and the second reflective surface;

the sanitization apparatus further includes a first lower plurality of LEDs that comprise the first LED disposed adjacent to the first reflective surface;

the sanitization apparatus further includes a first upper plurality of LEDs disposed adjacent to the first reflective surface and elevationally higher than the first lower plurality of LEDs;

the sanitization apparatus further includes a second lower plurality of LEDs that comprise the second LED disposed adjacent to the second reflective surface;

the sanitization apparatus further includes a second upper plurality of LEDs disposed adjacent to the second reflective surface and elevationally higher than the second lower plurality of LEDs;

the chamber is at least partially disposed between the first lower plurality of LEDs and the second lower plurality of LEDs;

the chamber is at least partially disposed between the first upper plurality of LEDs and the second lower plurality of LEDs;

each of the LEDs of the first lower plurality of LEDs, the first upper plurality of LEDs, the second lower plurality of LEDs, and the second upper plurality of LEDs comprises a die comprising a primary surface, and each of the primary surfaces of the dies of the first lower plurality of LEDs, the first upper plurality of LEDs, the second lower plurality of LEDs, and the second upper plurality of LEDs defines a plane that extends through the chamber;

each of the primary surfaces of the dies of the first upper plurality of LEDs shares a plane substantially in common;

each of the primary surfaces of the dies of the first lower plurality of LEDs shares a plane substantially in common;

each of the primary surfaces of the dies of the second upper plurality of LEDs shares a plane substantially in common;

each of the primary surfaces of the dies of the second lower plurality of LEDs shares a plane substantially in common;

each LED of the first lower plurality of LEDs faces one of the LEDs of the first upper plurality of LEDs;

each LED of the second lower plurality of LEDs faces one of the LEDs of the second upper plurality of LEDs; and the first reflective surface is oriented to form an angle of 10 degrees or less from vertical.

According to a second aspect of the present disclosure, a vehicle comprises: (a) a sanitization apparatus comprising a chamber configured to accept an object to be sanitized with ultraviolet light; and (b) a first sanitization module, the first sanitization module comprising (i) a first reflective surface facing the chamber that defines a plane, the first reflective surface being reflective of ultraviolet light, and (ii) a first light emitting diode (LED) comprising a die that is configured to emit ultraviolet light, the die comprising a primary surface that defines a plane that intersects with the plane that that the first reflective surface defines.

Embodiments of the second aspect of the present disclosure can include any one or a combination of the following features:

- the first sanitization module further comprises a housing that structurally supports the first LED, the housing comprising a wall that extends at least partially around a perimeter of the first reflective surface, the first LED being disposed on the wall;
- the wall comprises an inner surface that supports the first LED, and the primary surface of the die is substantially parallel to the inner surface of the wall adjacent to the first LED;
- at least a portion of the ultraviolet light that the first LED emits reflects off the first reflective surface and into the chamber;
- the sanitization apparatus further comprises a second sanitization module, the second sanitization module comprising (i) a second reflective surface that defines a plane and faces the chamber and at least partially faces the first reflective surface of the first sanitization module, the second reflective surface being reflective of ultraviolet light, and (ii) a second LED comprising a die that is configured to emit ultraviolet light, the die comprising a primary surface that defines a plane that intersects with the plane that the second reflective surface defines;
- the chamber is at least partially disposed between the first sanitization module and the second sanitization module, with the first reflective surface of the first sanitization module and the second reflective surface of the second sanitization module both facing the chamber and at least partially facing each other;
- the first sanitization module further comprises (i) a first lower plurality of LEDs comprising the first LED, (ii) a first upper plurality of LEDs elevationally higher than the first lower plurality of LEDs, and (iii) a housing comprising a wall that extends at least partially around a perimeter of the first reflective surface, the first upper plurality of LEDs and the first lower plurality of LEDs being disposed on the wall;
- the second sanitization module further comprises (i) a second lower plurality of LEDs comprising the second LED, (ii) a second upper plurality of LEDs disposed elevationally higher than the second lower plurality of LEDs, and (iii) a housing comprising a wall that extends at least partially around a perimeter of the second reflective surface, the second upper plurality of LEDs and the second lower plurality of LEDs being disposed on the wall;
- at least a portion of the ultraviolet light that the first upper plurality of LEDs and the first lower plurality of LEDs emits reflects off the first reflective surface and into the chamber;
- at least a portion of the ultraviolet light that the second upper plurality of LEDs and the second lower plurality of LEDs emits reflects off the second reflective surface and into the chamber;
- each of the LEDs of the first lower plurality of LEDs, the first upper plurality of LEDs, the second lower plurality of LEDs, and the second upper plurality of LEDs comprises a die comprising a primary surface, and each of the primary surfaces of the dies of the first lower plurality of LEDs, the first upper plurality of LEDs, the second lower plurality of LEDs, and the second upper plurality of LEDs defines a plane that extends through the chamber;
- the sanitization apparatus further comprises a floor that provides one of the surfaces that at least partially defines the chamber, the floor configured to support the object to be sterilized from below the object; and
- the planes that the primary surfaces of the dies of the first lower plurality of LEDs and the second lower plurality of LEDs form extend above the floor.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
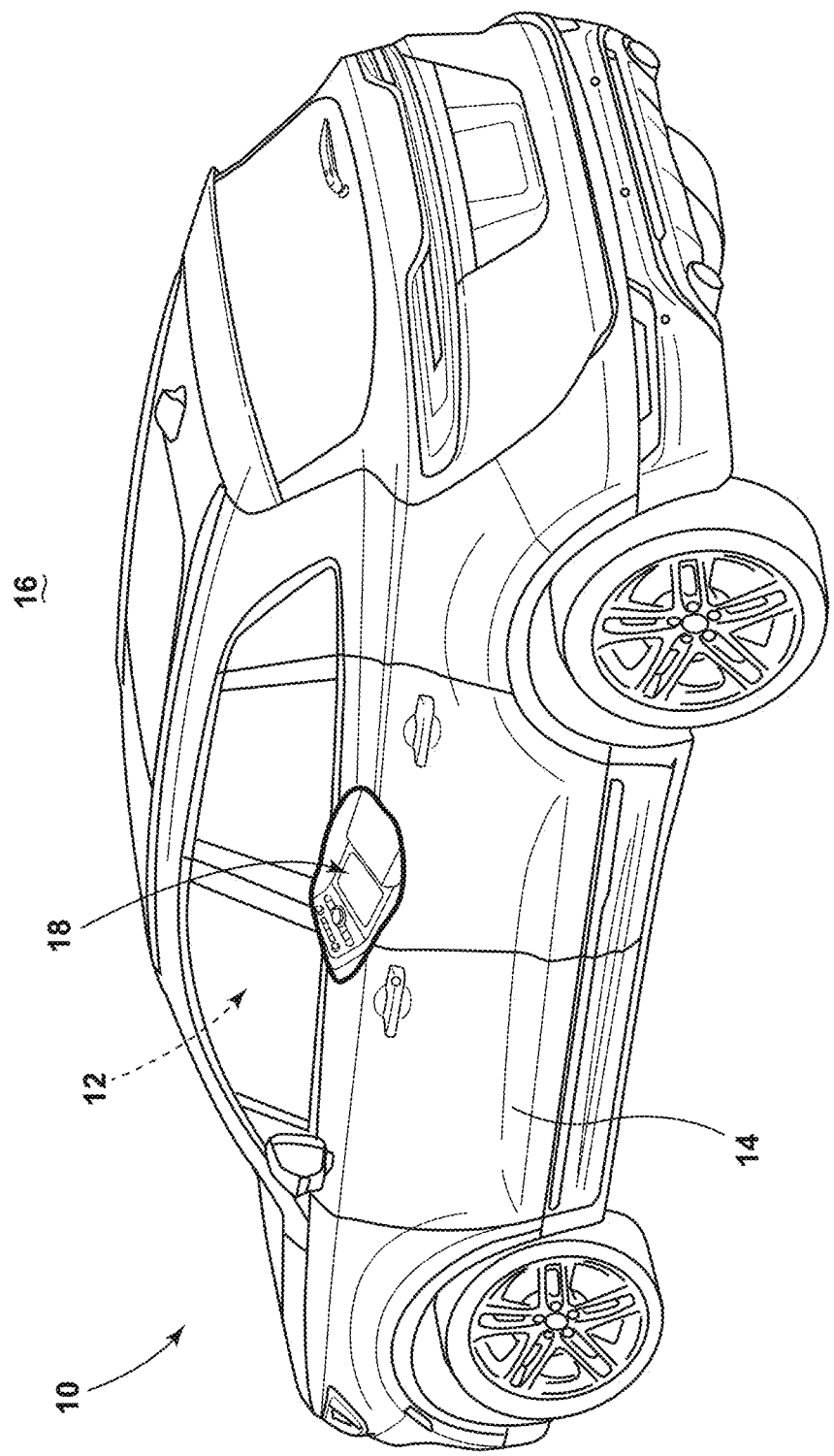
FIG. 1 is a perspective view of a vehicle, illustrating the vehicle including an interior and a sanitization apparatus of the disclosure accessible from the interior.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

For purposes of description herein, the terms "below," "horizontally," "above," "vertically," and "higher" shall relate to the concepts as oriented in FIG. 3. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
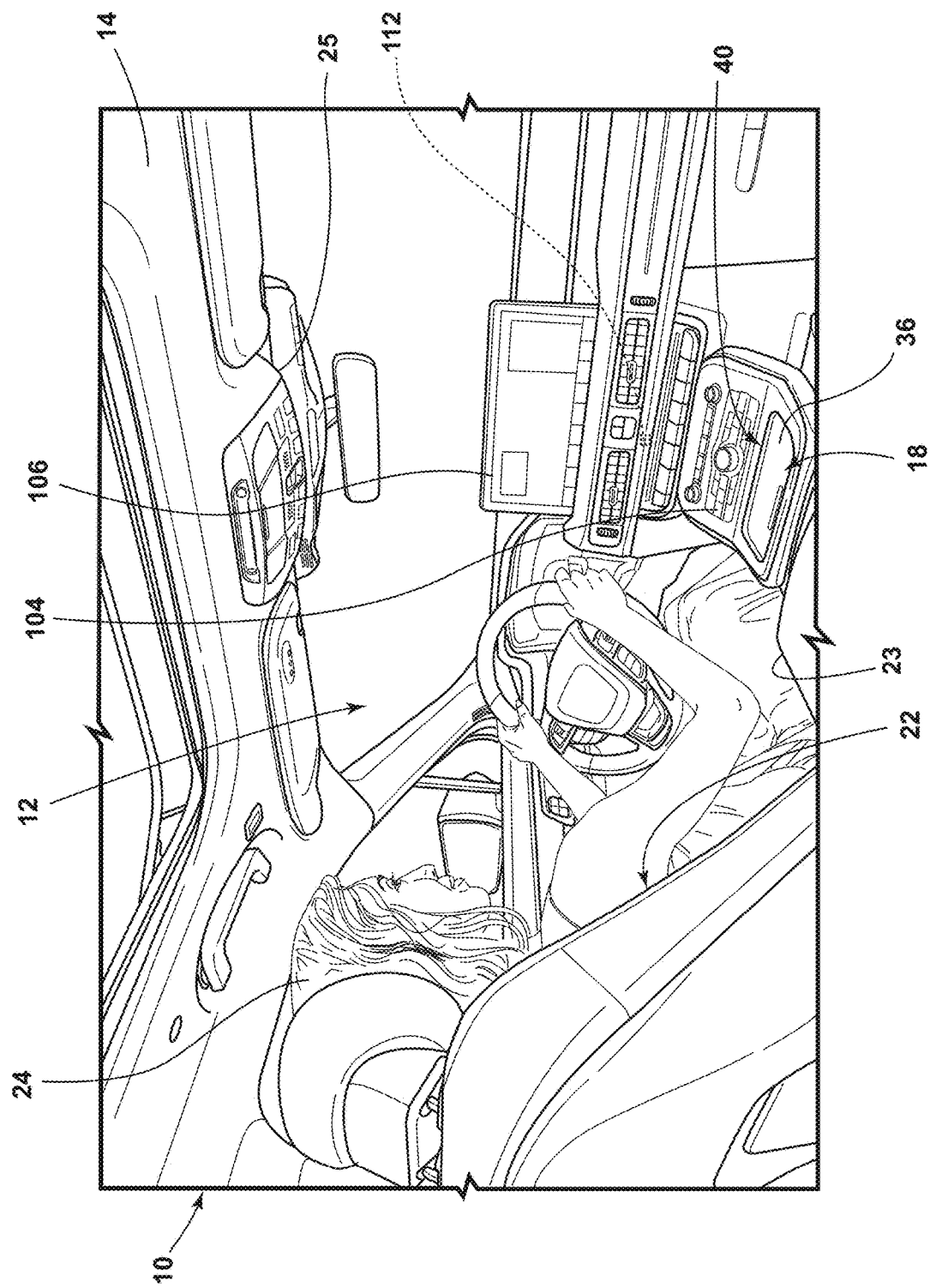
FIG. 2 is a perspective view of the interior of FIG. 1, illustrating the sanitization apparatus including a lid in a closed position.
Figure 3:
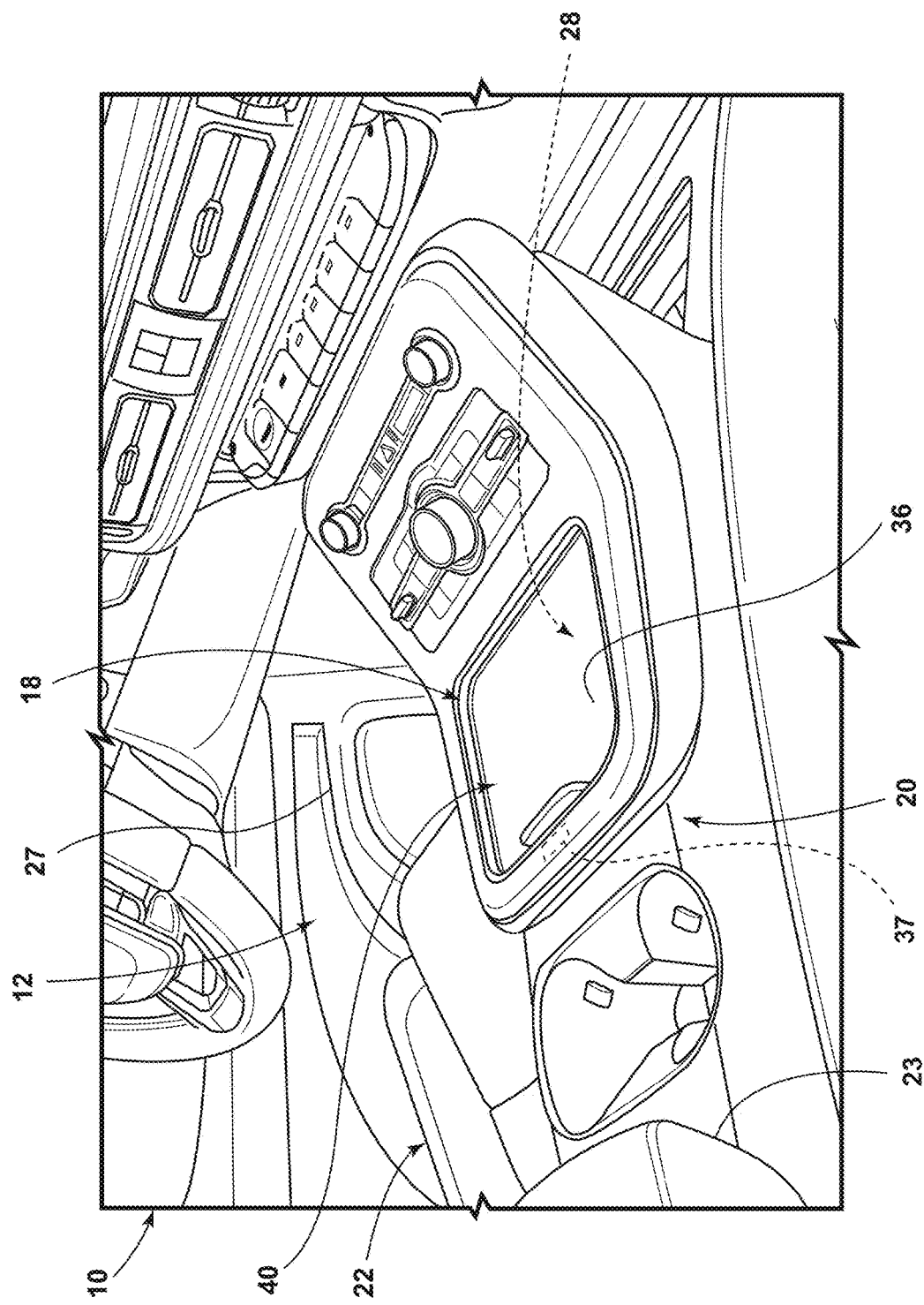
FIG. 3 is another perspective view of the interior of FIG. 1, illustrating the lid of the sanitization apparatus covering a chamber within the sanitization apparatus.

Referring to FIGS. 1-3, a vehicle 10 includes an interior 12 and a body 14 that separates the interior 12 from an environment 16 external to the vehicle 10. The vehicle 10 further includes a sanitization apparatus 18. In embodiments, the sanitization apparatus 18 is disposed in the interior 12 but need not be. For example, the vehicle 10 can further include a center console 20, with the sanitization apparatus 18 forming a component of the center console 20. In embodiments, the vehicle 10 further includes a seating assembly 22, and the sanitization apparatus 18 is disposed adjacent to the seating assembly 22 to permit a user 24 occupying the seating assembly 22 to utilize the sanitization apparatus 18. In other embodiments, the sanitization apparatus 18 is available for use from the environment 16 external to the vehicle 10. The vehicle 10 can be a car, a truck, a van, a sports utility vehicle 10, among other things. The vehicle 10 can be operated by an operator (who can be the user 24 but need not be), semi-autonomous, or fully autonomous. In embodiments, the vehicle 10 is used to transport the user as part of a ridesharing, ride hailing, vehicle for hire, or rental car service. Instead of being exposed to the interior 12 at the center console 20, in embodiments, the sanitization apparatus 18 is disposed under an armrest 23 at the center console 20. Further, instead of forming a component of the center console 20, in embodiments, the sanitization apparatus 18 can be a component of a ceiling 25 or a door-trim 27. These are but several examples, without limitation, of where the sanitizations apparatus 18 could be disposed.

Figure 4:
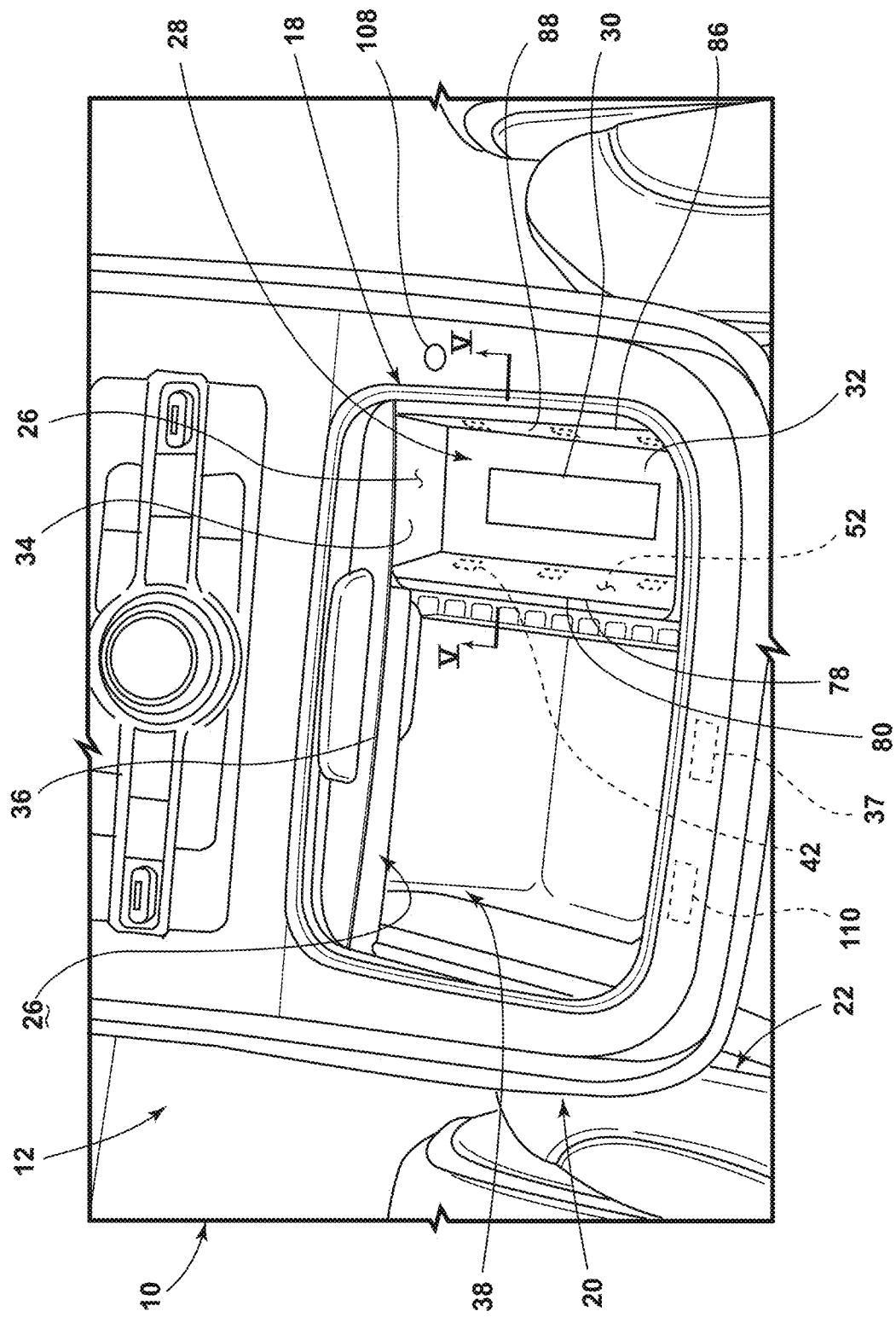
FIG. 4 is a perspective view of the sanitization apparatus of FIG. 1, illustrating the lid in an open position revealing the chamber, and an object disposed within the chamber to be sanitized with ultraviolet light emitted by one or more LEDs including a first LED.
Figure 5:
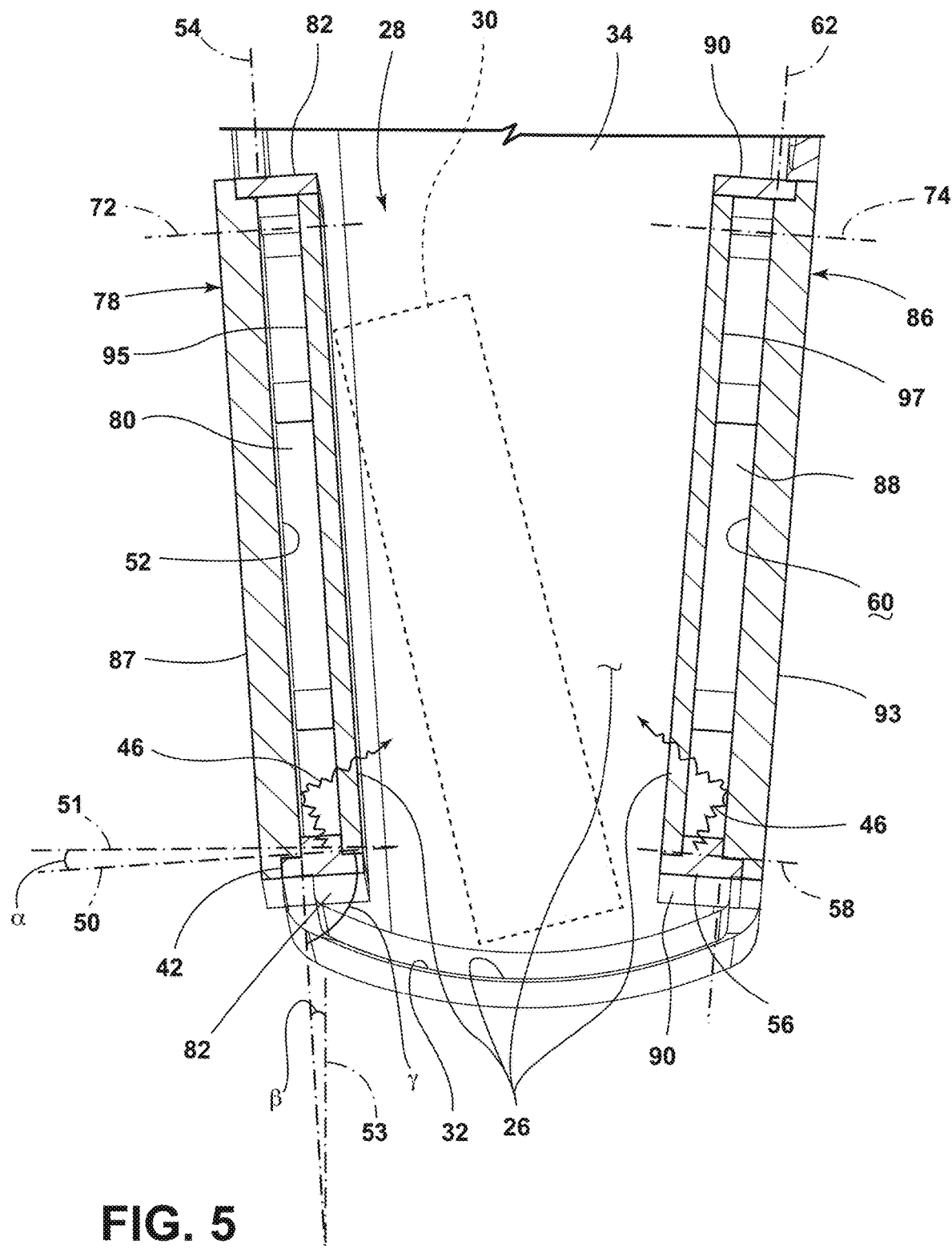
FIG. 5 is an elevation view of a cross section of the sanitization apparatus of FIG. 1 taken through the line IV-IV of FIG. 5, illustrating the first LED positioned so that a plane that a primary surface of a die of the first LED is generally perpendicular to a first reflective surface of the sanitization apparatus so that some of the ultraviolet light that the first LED emits reflect off of the first reflective surface before entering the chamber and impinging upon the object.

Referring now additionally to FIGS. 4-5, the sanitization apparatus 18 includes surfaces 26 that collectively define a chamber 28. The chamber 28 is configured to accept an object 30 to be sanitized with ultraviolet light, such as pursuant to a sanitization operation that the vehicle 10 performs. In embodiments, the sanitization apparatus 18 includes a floor 32 providing one or more of the surfaces 26 at least partially defining the chamber 28. The floor 32 supports the object 30 to be sanitized from below the object 30. In embodiments, the sanitization apparatus 18 further includes one or more side walls 34 that provide one or more of the surfaces 26 at least partially defining the chamber 28. The one or more side walls 34 extend upward from the floor 32. In embodiments, the sanitization apparatus 18 further includes a lid 36 that provides selective access to the chamber 28. The lid 36 is movable to, from, and between an open position 38 and a closed position 40. In the open position 38, the lid 36 provides the user 24 access from the interior 12 into the chamber 28. In the closed position 40, the lid 36 denies the user 24 access from the interior 12 into the chamber 28. In the closed position, the lid 36 provides one of the surfaces 26 defining the chamber 28. In embodiments, the sanitization apparatus 18 further includes a lock 37 to interact with the lid 36 and, when engaged, prevents the lid 36 from moving away from the closed position 40 toward the open position 38.

The object 30 can be anything that fits in the chamber 28 and that a user 24 desires to be sanitized. Examples of the object 30 include a smartphone, a key chain unit, money, among other things.

Figure 6:
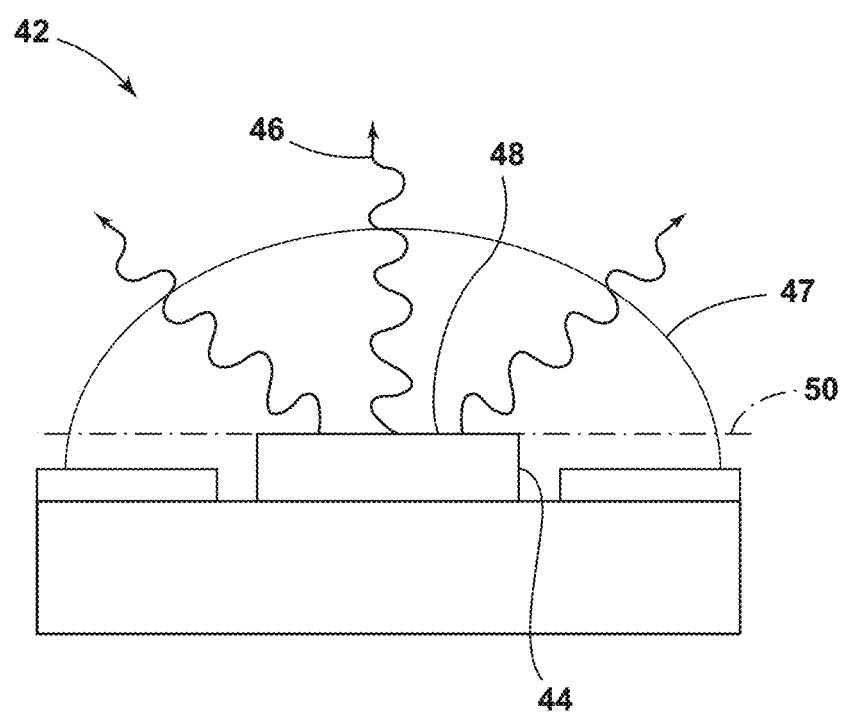
FIG. 6 is an elevation view of a vertical cross section of the first LED (and the other ultraviolet LEDs of the sanitization apparatus), illustrating the plane that the primary surface of the die forms.

Referring now additionally to FIG. 6, the sanitization apparatus 18 further includes a first light emitting diode ("LED") 42. The first LED 42 includes a die 44. The die 44 is configured to emit the ultraviolet light 46 that sanitizes the object 30 placed in the chamber 28. For example, the die 44 typically includes a semiconductor material that, when interacting with an appropriate electric field, emits electromagnetic wavelengths within the ultraviolet range. "Ultraviolet light," for purposes of this disclosure, means light having a wavelength within a range of from 10 nm to 400 nm. In embodiments, the ultraviolet light 46 that the die 44 of the first LED 42 (and any other ultraviolet light LED mentioned herein) emits has a peak intensity within a range of from 100 nm to 400 nm, such as within a range of from 100 nm to 280 nm, from 200 nm to 280 nm, from 240 nm to 300 nm, from 270 nm to 280 nm, or from 315 nm to 400 nm. The first LED 42 can further include a substrate 47 covering the die 44 that is substantially transparent to the ultraviolet light 46.

The die 44 of the first LED 42 includes a primary surface 48. The primary surface 48 is substantially planar and defines a plane 50. The plane 50 extends through the chamber 28 and can intersect with the object 30 placed within the chamber 28. In embodiments, the plane 50 that the primary surface 48 of the die 44 defines varies from horizontal 51 by an angle α of 10 degrees or less. In embodiments, the plane 50 is oriented substantially horizontally. In embodiments, the plane 50 is oriented closer to horizontal 51 than to vertical 53. In embodiments the primary surface 48 of the die 44 does not face the chamber 28. In embodiments, the plane 50 that the primary surface 48 of the die 44 defines extends above the floor 32 of the chamber 28.

Figure 7:
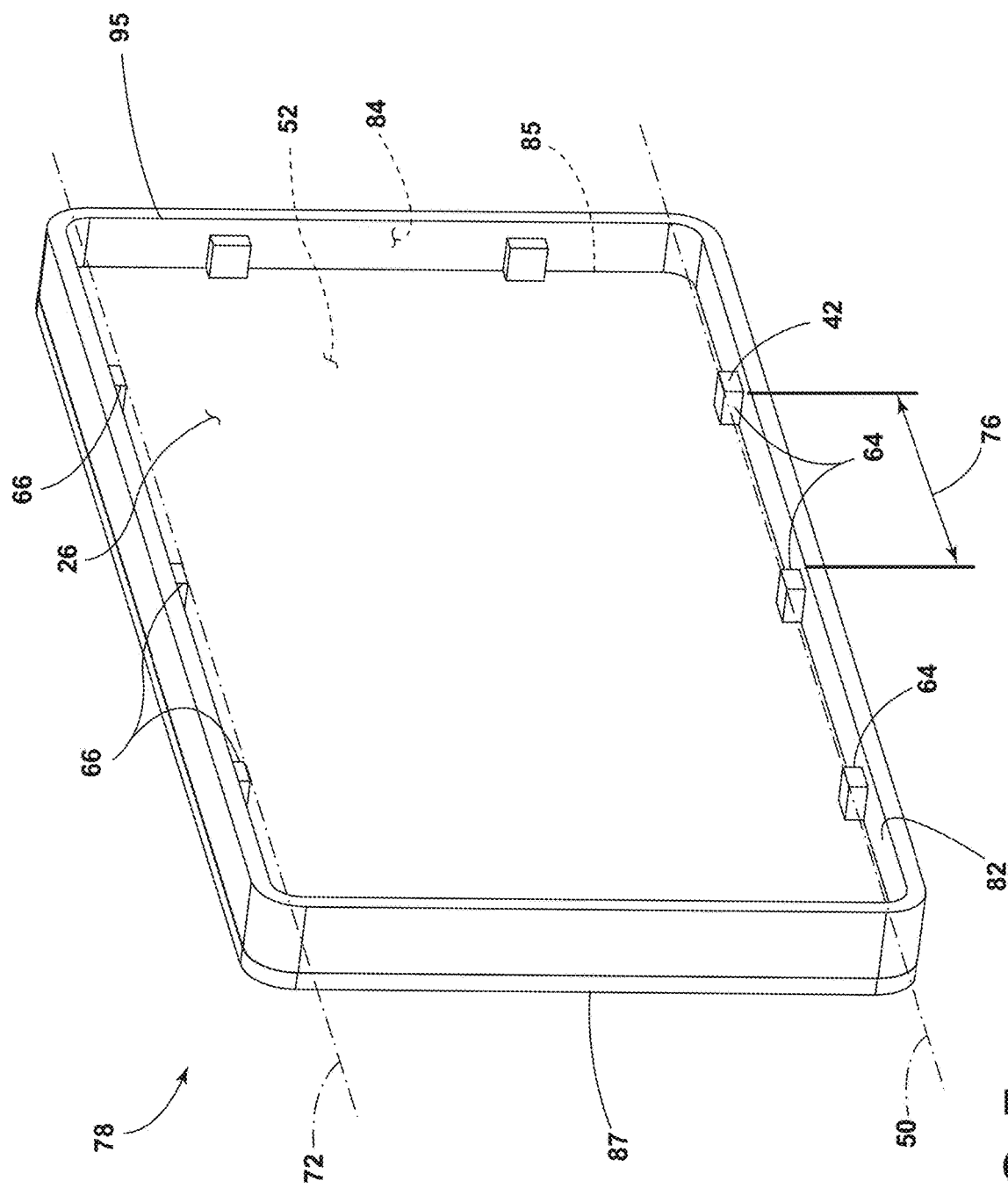
FIG. 7 is a perspective view of the first sanitization module of the sanitization apparatus of FIG. 1, illustrating the wall of the housing supporting (i) a first lower plurality of LEDs (including the first LED) all having dies with a primary surface aligned to share a plane in common and (ii) a first upper plurality of LEDs facing the first lower plurality of LEDs, the first upper plurality of LEDs all having dies with a primary surface aligned to share a plane in common.
Figure 8:
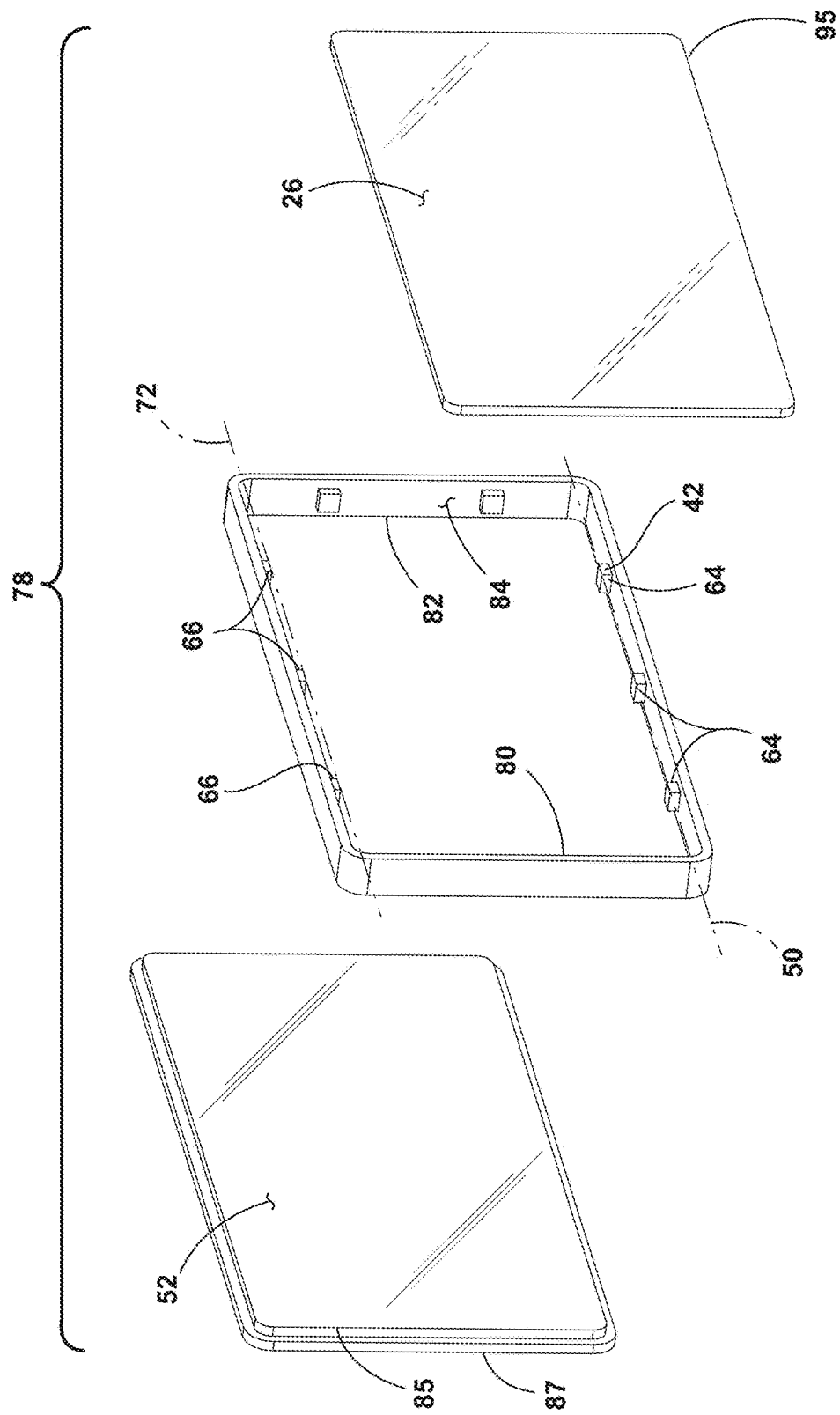
FIG. 8 is perspective exploded view of the first sanitization module of FIG. 7, illustrating (i) a back plate providing the first reflective surface, (ii) a housing with a wall projecting around a perimeter of the first reflective surface, (iii) the first LED and other ultraviolet LEDs disposed on the wall, and (iv) a cover substantially transparent to the ultraviolet light that the ultraviolet LEDs emit covering the first reflective surface and the ultraviolet LEDs.
Figure 9:
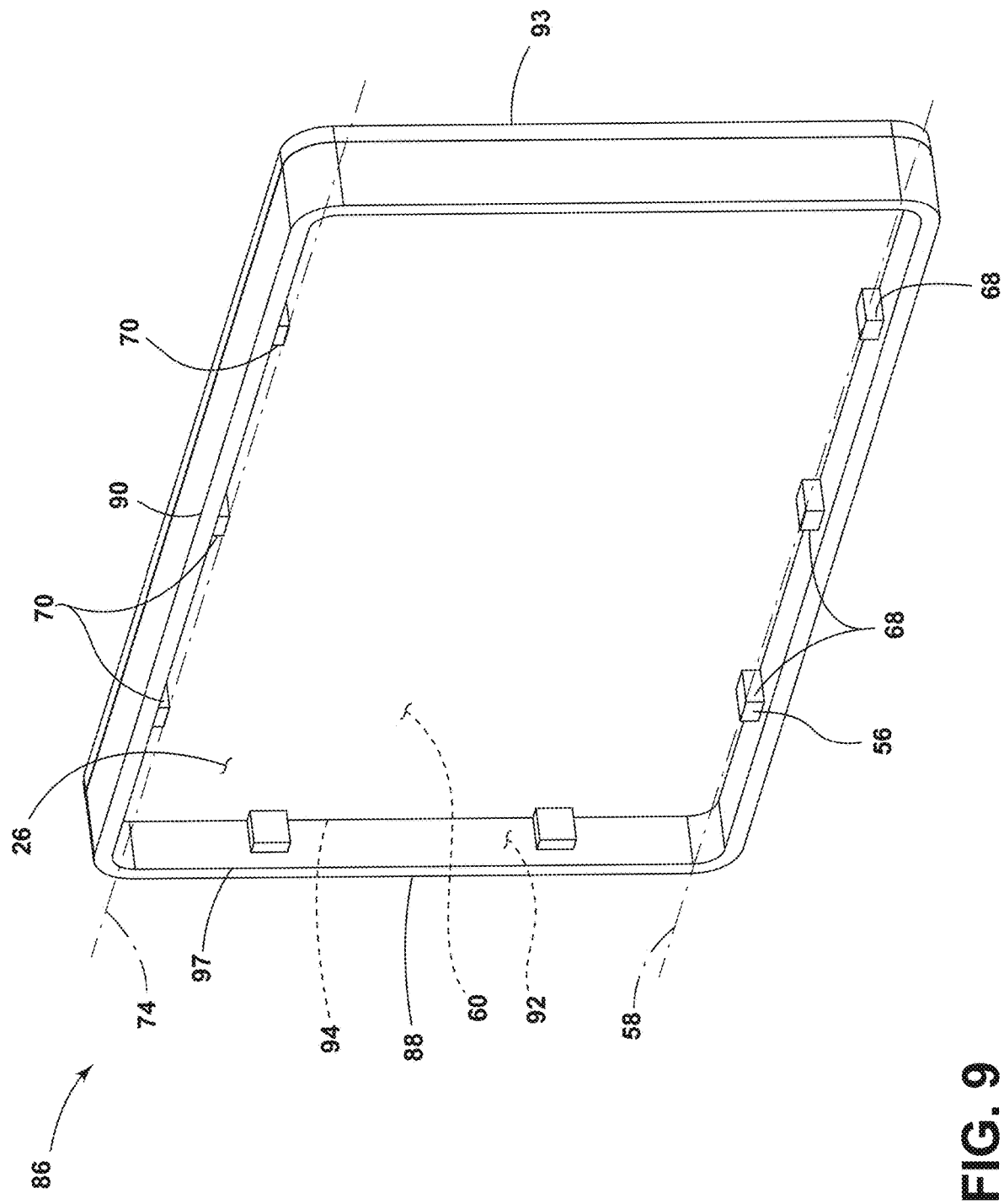
FIG. 9 is a perspective view of a second sanitization module of the sanitization apparatus of FIG. 1 that faces the first sanitization module, the second sanitization module including a second reflective surface and a housing with a wall that supports (i) a second lower plurality of LEDs all having dies with a primary surface aligned to share a plane in common and (ii) a second upper plurality of LEDs facing the second lower plurality of LEDs, the second upper plurality of LEDs all having dies with a primary surface aligned to share a plane in common.

Referring now additionally to FIGS. 7-9, in embodiments, the sanitization apparatus 18 further includes a first reflective surface 52. The first reflective surface 52 is reflective of the ultraviolet light 46 that the first LED 42 emits. "Reflective" for purposes of this disclosure means that the surface reflects greater than 50% of the ultraviolet light 46 that impinges upon the surface. In embodiments, the first reflective surface 52 includes polytetrafluroroethylene or aluminum, such as an aluminum foil or sputtered aluminum on a base substrate (e.g., glass).

The first reflective surface 52 is positioned relative to the first LED 42 so that at least a portion of the ultraviolet light 46 that the die 44 of the first LED 42 emits first reflects off of the first reflective surface 52 before entering into the chamber 28. For example, in embodiments, the first reflective surface 52 is disposed adjacent to the first LED 42. In embodiments, the first reflective surface 52 is substantially planar and defines a plane 54. In embodiments, the plane 54 that the first reflective surface 52 defines intersects with the plane 50 that the primary surface 48 of the die 44 of the first LED 42 defines. In embodiments, the plane 54 is separated from the plane by an angle γ that is within a range of from 80 degrees to 100 degrees. In embodiments, the plane 54 that the first reflective surface 52 defines is substantially perpendicular to the plane 50 that the primary surface 48 of the die 44 of the first LED 42 defines. The first reflective surface 52 faces the chamber 28. In embodiments, the first reflective surface 52 provides one of the surfaces 26 that at least partially defines the chamber 28. In embodiments, the first reflective surface 52, and the plane 54 that the first reflective surface 52 defines, are oriented substantially vertically. In embodiments, the plane 54 is separated from vertical 53 by an angle β of 10 degrees or less.

In embodiments, the sanitization apparatus 18 further includes a second LED 56. The second LED 56 and all other ultraviolet light emitting LEDs mentioned below, for purposes relevant to this disclosure, are identical to the first LED 42. The first LED 42, the second LED 56, and all other ultraviolet light emitting LEDs mentioned below are hereinafter collectively referred to as "the ultraviolet LEDs 42." For example, without the need to be separately illustrated, each of the ultraviolet LEDs 42 includes a die 44 that is configured to emit ultraviolet light 46, and the die 44 of each of the ultraviolet LEDs 42 includes a primary surface 48. In embodiments, the primary surface 48 of the die 44 of each of the ultraviolet LEDs 42 does not face the chamber 28.

The primary surface 48 of the second LED 56 defines a plane 58 that extends through the chamber 28, and intersects with the object 30 placed within the chamber 28. In embodiments, the plane 58 that the primary surface 48 of the die 44 of the second LED 56 defines extends above the floor 32 of the chamber 28. In embodiments, the plane 58 is oriented substantially horizontally. In embodiments, the plane 58 is oriented closer to horizontal 51 than to vertical 53. In embodiments, the plane 58 is separated from horizontal 51 by an angle of 10 degrees or less.

In embodiments, the sanitization apparatus 18 further includes a second reflective surface 60. The second reflective surface 60 is reflective of the ultraviolet light 46 that the second LED 56 emits. The second reflective surface 60 is positioned relative to the second LED 56 so that at least a portion of the ultraviolet light 46 that the die 44 of the second LED 56 emits first reflects off of the second reflective surface 60 before entering into the chamber 28. For example, in embodiments, the second reflective surface 60 is disposed adjacent to the second LED 56. In embodiments, the second reflective surface 60 is substantially planar and defines a plane 62. In embodiments, the plane 62 that the second reflective surface 60 defines intersects with (i) the plane 58 that the primary surface 48 of the die 44 of the second LED 56 defines and (ii) the plane 50 that the primary surface 48 of the die 44 of the first LED 42 defines. In embodiments, the plane 62 that the second reflective surface 60 defines is substantially perpendicular to the plane 58 that the primary surface 48 of the die 44 of the second LED 56 defines. In embodiments, the plane 62 is separated from the plane 58 by an angle within a range of from 80 degrees to 100 degrees. The second reflective surface 60 faces the chamber 28. In embodiments, the second reflective surface provides one of the surfaces 26 that at least partially defines the chamber 28. In embodiments, the second reflective surface 60 at least partially faces the first reflective surface 52. In embodiments, the chamber 28 is at least partially disposed between the first reflective surface 52 and the second reflective surface 60. In embodiments, the planes 54, 62, respectively, that the first reflective surface 52 and the second reflective surface 60 define are substantially parallel to each other. In embodiments, the planes 54 and 62 are separated by an angle of 10 degrees or less. In embodiments, the plane 62 is oriented substantially vertically. In embodiments, the plane 62 is separated from vertical 53 by an angle of 10 degrees or less. In embodiments, the surface 26 that the lid 36 provides is reflective.

In embodiments, the first sanitization apparatus 18 further includes a first lower plurality of LEDs 64 and a first upper plurality of LEDs 66 that are disposed adjacent to the first reflective surface 52. The first LED 42 already discussed can be part of the first lower plurality of LEDs 64 (as in the illustrated embodiments) or the first upper plurality of LEDs 66. The first upper plurality of LEDs 66 are disposed elevationally higher than the first lower plurality of LEDs 64. The first upper plurality of LEDs 66 and the first lower plurality of LEDs 64 are positioned relative to the first reflective surface 52 so that at least a portion of the ultraviolet light 46 that the first upper plurality of LEDs 66 and the first lower plurality of LEDs 64 emit reflects first off the first reflective surface 52 before entering into the chamber 28.

In embodiments, the first sanitization apparatus 18 further includes a second lower plurality of LEDs 68 and a second upper plurality of LEDs 70 that are disposed adjacent to the second reflective surface 60. The second LED 56 already discussed can be part of the second lower plurality of LEDs 68 (as in the illustrated embodiments) or the second upper plurality of LEDs 70. The second upper plurality of LEDs 70 are disposed elevationally higher than the second lower plurality of LEDs 68. The second upper plurality of LEDs 70 and the second lower plurality of LEDs 68 are positioned relative to the second reflective surface 60 so that at least a portion of the ultraviolet light 46 that the second upper plurality of LEDs 70 and the second lower plurality of LEDs 68 emit reflects first off the second reflective surface 60 before entering into the chamber 28.

The chamber 28 is at least partially disposed between the first upper plurality of LEDs 66 and the second upper plurality of LEDs 70. The chamber 28 is at least partially disposed between the first lower plurality of LEDs 64 and the second lower plurality of LEDs 68. In embodiments, each LED of the first lower plurality of LEDs 64 faces one of the LEDs of the first upper plurality of LEDs 66, with the primary surfaces 48 of the dies 44 of the LEDs of the first lower plurality of LEDs 64 facing the primary surfaces 48 of the dies 44 of the LEDs of the first upper plurality of LEDs 66. In embodiments, each LED of the second lower plurality of LEDs 68 faces one of the LEDs of the second upper plurality of LEDs 70, with the primary surfaces 48 of the dies 44 of the LEDs of the second lower plurality of LEDs 68 facing the primary surfaces 48 of the dies 44 of the LEDs of the second upper plurality of LEDs 70.

Each primary surface 48 of the dies 44 of the first lower plurality of LEDs 64, the first upper plurality of LEDs 66, the second lower plurality of LEDs 68, and the second upper plurality of LEDs 70 defines a plane that extends through the chamber 28. In embodiments, the primary surfaces 48 of the dies 44 of the first upper plurality of LEDs 66 share a plane 72 substantially in common. In embodiments, the primary surfaces 48 of the dies 44 of the first lower plurality of LEDs 64 share the plane 50 of the first LED 42 substantially in common. In embodiments, the primary surfaces 48 of the dies 44 of the second upper plurality of LEDs 70 share a plane 74 substantially in common. In embodiments, the primary surfaces 48 of the dies 44 of the second lower plurality of LEDs 68 share the plane 58 of the second LED 56 substantially in common. In embodiments, the plane 72 of the first upper plurality of LEDs 66 and the plane 74 of the second upper plurality of LEDs 70 are coplanar. In embodiments, the plane 50 of the first lower plurality of LEDs 64 and the plane 58 of the second lower plurality of LEDs 68 are coplanar. In embodiments, the plane 72 and the plane 74 are substantially horizontal. In embodiments, the plane 72 and the plane 74 are separated from horizontal 51 by an angle of 10 degrees or less. In embodiments, the plane 72 is separated from the plane 54 that the first reflective surface 52 forms by an angle within a range of from 80 degrees to 100 degrees. In embodiments, the plane 74 is separated from the plane 62 that the second reflective surface 60 forms by an angle within a range of from 80 degrees to 100 degrees. The planes 50, 58, respectively, that the primary surfaces 48 of the dies 44 of the first lower plurality of LEDs 64 and the second lower plurality of LEDs 68 form extend above the floor 32.

In embodiments, the first upper plurality of LEDs 66 are all in electrical communication as a strip of LEDs. In embodiments, the first lower plurality of LEDs 64 are all in electrical communication as a strip of LEDs. In embodiments, the second upper plurality of LEDs 70 are all in electrical communication as a strip of LEDs. In embodiments, the second lower plurality of LEDs 68 are all in electrical communication as a strip of LEDs. In the illustrated embodiments, the first upper plurality of LEDs 66 and the first lower plurality of LEDs 64 each include three LEDs but could each include any number of LEDs greater than one LED, such as one, two, three, four, five, or six, or more LEDs. In the illustrated embodiments, the second upper plurality of LEDs 70 and the second lower plurality of LEDs 68 each include three LEDs but could each include any number of LEDs greater than one LED, such as one, two, three, four, five, or six, or more LEDs. In embodiments, the LEDs of the first lower plurality of LEDs 64, the LEDs of the first upper plurality of LEDs 66, the LEDs of the second lower plurality of LEDs 68, and the LEDs of the second upper plurality of LEDs 70 are separated, center-to-center, by a distance 76 that is substantially the same. In embodiments, the distance 76 is 10 mm, 20 mm, 30 mm, 40 mm, 50 mm, 60 mm, 70 mm, 80 mm, 90 mm, or 100 mm, or within any range bound by any two of those values (e.g., within a range of from 10 mm to 100 mm, 30 mm to 60 mm, and so on).

In embodiments, the sanitization apparatus 18 further includes a first sanitization module 78. The first sanitization module 78 includes a housing 80. The housing 80 structurally supports the first LED 42 and, if included, the first upper plurality of LEDs 66 and the first lower plurality of LEDs 64. The housing 80 includes a wall 82 with an inner surface 84 that extends at least partially around a perimeter 85 of the first reflective surface 52. The first LED 42, and if included, the first upper plurality of LEDs 66 and the first lower plurality of LEDs 64, are disposed on the inner surface 84 of the wall 82. In embodiments, the primary surface 48 of the die 44 of the first LED 42, and the primary surfaces 48 of the dies 44 of the first upper plurality of LEDs 66 and the first lower plurality of LEDs 64, if included, are substantially parallel to the inner surface 84 of the wall 82. In embodiments, the first sanitization module 78 further includes a back plate 87 to which the housing 80 is attached that provides the first reflective surface 52. The first reflective surface 52 faces the chamber 28.

In embodiments, the sanitization apparatus 18 further includes a second sanitization module 86. The chamber 28 is at least partially disposed between the first sanitization module 78 and the second sanitization module 86. The second sanitization module 86 includes a housing 88. The housing 88 structurally supports the second LED 56 and, if included, the second upper plurality of LEDs 70 and the second lower plurality of LEDs 68. The housing 88 includes a wall 90 with an inner surface 92 that extends at least partially around a perimeter 94 of the second reflective surface 60. The second LED 56, and if included, the second upper plurality of LEDs 70 and the second lower plurality of LEDs 68, are disposed on the inner surface 92 of the wall 90. In embodiments, the primary surface 48 of the die 44 of the second LED 56, and the primary surfaces 48 of the dies 44 of the second upper plurality of LEDs 70 and the second lower plurality of LEDs 68, if included, are substantially parallel to the inner surface 92 of the wall 90. In embodiments, the second sanitization module 86 further includes a back plate 93 to which the housing 88 is attached that provides the second reflective surface 60. The second reflective surface 60 faces the chamber 28 and at least partially faces the first reflective surface 52.

In embodiments, the first sanitization module 78 further includes a cover 95. The cover 95 is attached to the housing 80. The cover 95 is disposed over the first reflective surface 52, the first lower plurality of LEDs 64 and the first upper plurality of LEDs 66. The cover 95 is sufficiently transparent to the ultraviolet light 46 that the ultraviolet light 46 emitted transmits through the cover 95 and into the chamber 28. The cover 95 provides one of the surfaces 26 at least partially defining the chamber 28.

In embodiments, the second sanitization module 86 further includes a cover 97. The cover 97 is attached to the housing 88. The cover 97 is disposed over the second reflective surface 60, the second lower plurality of LEDs 68 and the second upper plurality of LEDs 70. The cover 97 is sufficiently transparent to the ultraviolet light 46 that the ultraviolet light 46 emitted transmits through the cover 97 and into the chamber 28. The cover 97 provides one of the surfaces 26 at least partially defining the chamber 28.

In embodiments, when the lid 36 is in the closed position 40, the ultraviolet light 46 that the ultraviolet LEDs 42 emit within the chamber 28 does not escape the chamber 28 and enter into the remainder of the interior 12. In other words, the surfaces 26 forming the chamber 28 retain the ultraviolet light 46 that has been emitted within the chamber 28.

Figure 10:
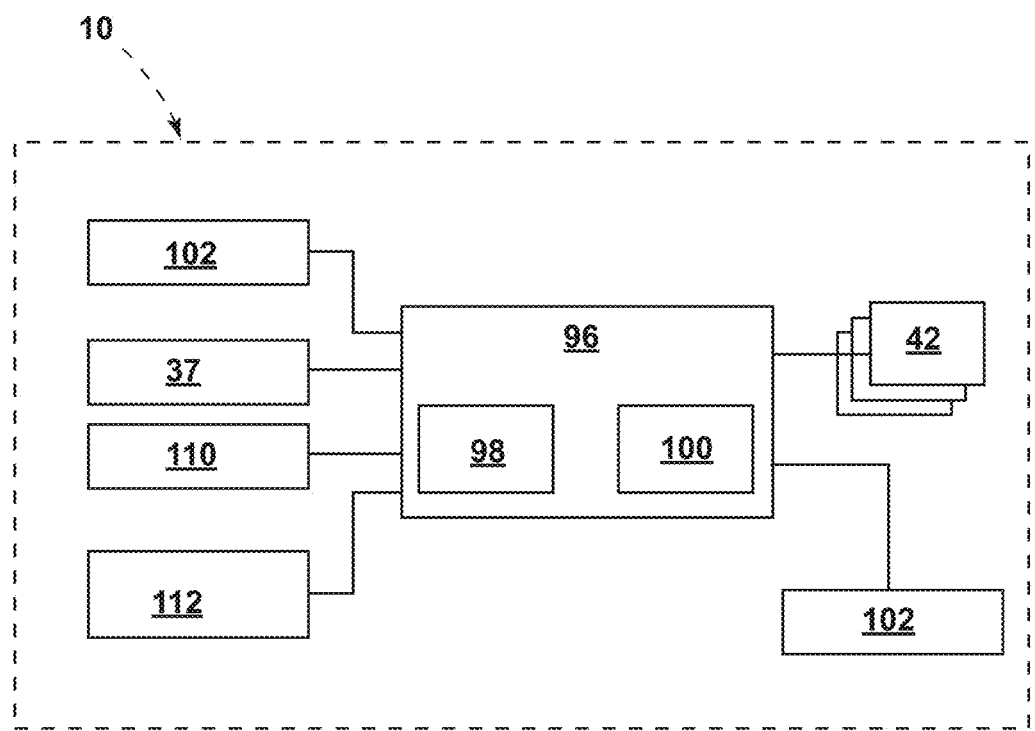
FIG. 10 is a schematic illustration of the vehicle of FIG. 1 including a controller in communication with the ultraviolet LEDs of the sanitization apparatus of FIG. 1 to control activation and deactivation thereof according to a sanitization operation and receiving the output that various sensors and a human-machine interface generate.

Referring now additionally to FIG. 10, the vehicle 10 further includes a controller 96. The controller 96 is in communication with the ultraviolet LEDs 42 and, in embodiments, the lock 37. The controller 96 includes a processor 98 and memory 100. The processor 98 executes programs stored in memory 100 to effectuate activation and deactivation of the ultraviolet LEDs 42 included with the sanitization apparatus 18 in conjunction with the sanitization operation. Battery sources (not illustrated) within the vehicle 10 provide electrical power to activate the ultraviolet LEDs 42.

In embodiments, the vehicle 10 further includes a human-machine interface 102 (such as a button 104 or a touch screen display 106). The human-machine interface 102 is in communication with the controller 96. After the user 24 places the object 30 desired to be sanitized within the chamber 28 and closes the lid 36, the user 24 can utilize the human-machine interface 102 to command the controller 96 to begin the sanitization operation that causes the controller 96 to activate the ultraviolet LEDs 42. The controller 96 can then cause the ultraviolet LEDs 42 to activate and emit the ultraviolet light 46 that sanitizes the object 30. The controller 96 can cause the ultraviolet LEDs 42 to so emit the ultraviolet light 46 for a period of time that is predetermined, such as within a range of 1 minute to 10 minutes (e.g., 5 minutes), and then deactivate the LEDs 42. The human-machine interface 102 may allow the user 24 to select the period of time. In embodiments, the human-machine interface 102 is an application on a mobile computing device of the user 24 that is in communication with the controller 96 (e.g., via Bluetooth or Wi-Fi communication). The controller 96 can cause the ultraviolet LEDs 42 to emit the ultraviolet light 46 for the sanitization operation while the vehicle 10 is moving and, in embodiments, only while the vehicle 10 is parked (e.g., not moving).

In embodiments, the controller 96 causes the human-machine interface 102 to notify the user 24 regarding the status of the sanitization operation. For example, the controller 96 can cause the human-machine interface 102 to issue a notification that the sanitization operation is in process and that the ultraviolet LEDs 42 are emitting the ultraviolet light 46. As another example, the controller 96 can cause the human-machine interface 102 to issue a notification that the sanitization operation has concluded and that the ultraviolet LEDs 42 are no longer emitting the ultraviolet light 46. For the notifications described within this paragraph, the human-machine interface 102 can be or further includes a multi-color LED 108, with the controller 96 causing the multi-color LED 108 to display violet or red color light when the sanitization operation is ongoing. The controller 96 can cause the multi-color LED 108 to display green or blue when the sanitization operation has concluded or the ultraviolet LEDs 42 are otherwise not emitting ultraviolet light 46. The controller 96 can cause the human-machine interface 102 to indicate to the user 24 the time remaining until the sanitization operation concludes.

In embodiments, the sanitization apparatus 18 further includes a sensor 110. The sensor 110 is in communication with the controller 96. The output of the sensor 110 changes as a function of whether the lid 36 is in the closed position 40 or the open position 38. When the sensor 110 generates output that indicates that the lid 36 is not in the closed position 40, the controller 96 deactivates the ultraviolet LEDs 42 associated with the sanitization apparatus 18. In other words, the controller 96 activates the ultraviolet LEDs 42 associated with the sanitization apparatus 18 when the sensor 110 generates output indicative of the lid 36 being in the closed position 40. If the ultraviolet LEDs 42 associated with the sanitization apparatus 18 are activated and emitting ultraviolet light 46, the controller 96 deactivates the ultraviolet LEDs 42 when the sensor 110 produces output indicative of the lid 36 being moved from the closed position 40 (e.g., toward the open position 38). Further, the controller 96 causes the lock 37 to engage with the lid 36 to prevent the lid 36 from moving away from the closed position 40 before activating the ultraviolet LEDs 42.

In embodiments, the vehicle 10 further includes a sensor 112. The sensor 112 generates an output that changes as a function of whether ultraviolet light 46 is detected within the interior 12 and outside of the chamber 28. The sensor 112 is in communication with the controller 96. When the sensor 112 generates output indicative of ultraviolet light 46 above a certain threshold (e.g., zero) in the vicinity of the sanitization apparatus 18, then the controller 96 deactivates the ultraviolet LEDs 42.

The positioning of the ultraviolet LEDs 42 so that the planes 50, 58, 72, 74 that the primary surfaces 48 of the dies 44 the ultraviolet LEDs 42 form do not face directly at the object 30 within the chamber 28 but, rather, face generally perpendicular to (i) the chamber 28, (ii) the object 30 within the chamber 28, (iii) the first reflective surface 52 and, if included, (iv) the second reflective surface 60, reduce the creation of the "hot spots" of the ultraviolet light 46 upon the surface area of the object 30 to be sanitized. Rather, the ultraviolet light 46 that the ultraviolet LEDs 42 emit reflects to a certain degree first off of the first reflective surface 52 and the second reflective surface before entering the chamber 28. The ultraviolet light 46 that enters the chamber 28 and impinges upon the object 30 is more diffuse. Thus, a greater amount of the surface area of the object 30 within the chamber 28 receives the ultraviolet light 46 sufficiently to become sanitized.

Figure 11:
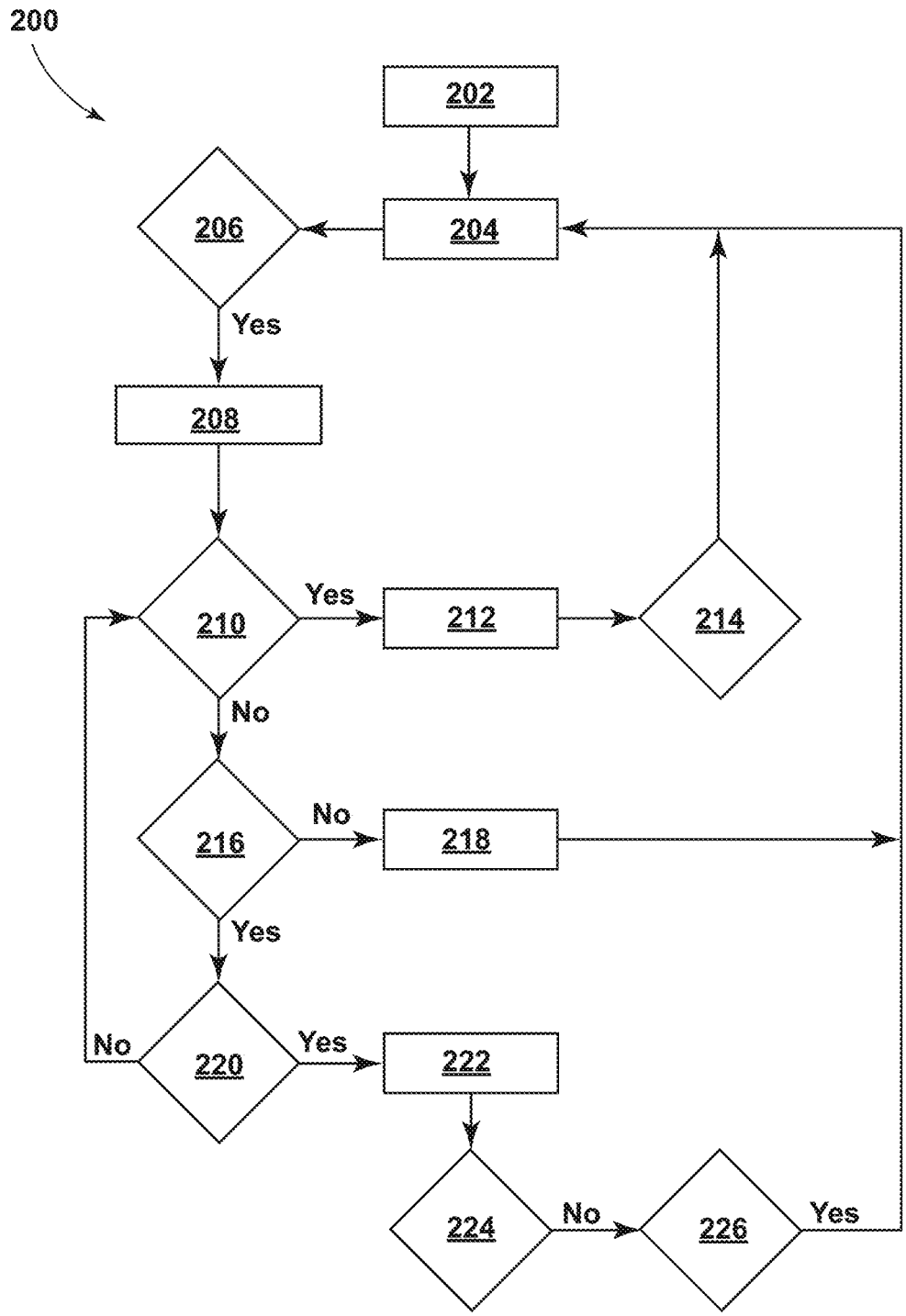
FIG. 11 is a flowchart of a method of operating the sanitization apparatus of FIG. 1.

Referring now to FIG. 11, a method 200 of operating the sanitization apparatus 18 is herein described. At a step 202, the vehicle 10 is powered, meaning that the sufficient electrical power is being supplied to the sanitization apparatus 18 to activate the ultraviolet LEDs 42. At a step 204, the controller 96 provides notification at the human-machine interface 102, such as by causing the multi-color LED 108 to emit blue color light, that the sanitization apparatus 18 is ready to accept the object 30 to be sanitized within the chamber 28. At a step 206, the controller 96 determines whether the lid 36 is in the closed position 40, such as by receiving a signal from the sensor 110 from which it can be determined whether the lid 36 is in the closed position 40. If the controller 96 determines that the lid 36 is in the closed position 40, the method 200 proceeds to a step 208. At the step 208, the controller 96 (i) activates the ultraviolet LEDs 42 to emit the ultraviolet light 46 onto the object 30 and (ii) provides notification at the human-machine interface 102, such as by causing the multi-color LED 108 to emit green color light, that the sanitization apparatus 18 is emitting the ultraviolet light 46 and sanitizing the object 30.

The method 200 then proceeds to a step 210. At the step 210, the controller 96 determines whether a temperature at the sanitization apparatus 18, such as at or near the ultraviolet LEDs 42, is greater than or equal to a predetermined high temperature (e.g., 45° C.). To make this determination, the controller 96 can receive a signal from the sensor (not illustrated) that varies as a function of temperature. If at the step 210 the controller 96 determines that the temperature at the sanitization apparatus 18 is greater than or equal to the predetermined high temperature, then the method 200 proceeds to a step 212. At the step 212, the controller 96 (i) deactivates the ultraviolet LEDs 42 and (ii) provides notification at the human-machine interface 102, such as by causing the multi-color LED 108 to emit a red color light, that the ultraviolet LEDs 42 have been deactivated because the predetermined high temperature has been met or exceeded. The method 200 then proceeds to a step 214, where the controller 96 determines whether the temperature at the sanitization apparatus 18 is less than or equal to a predetermined low temperature (e.g., 30° C.). If at the step 214 the controller 96 determines that the temperature at the sanitization apparatus 18 is less than equal to the predetermined low temperature, then the method 200 proceeds back to the step 204.

Referring back to the step 210, if at the step 210 the controller 96 determines that the temperature of the sanitization apparatus 18 is not greater than or equal to (e.g., is less than) the predetermined high temperature, then the method 200 proceeds to a step 216. At the step 216, the controller 96 determines again whether the lid 36 is in the closed position 40. If at the step 216 the controller 96 determines that the lid 36 is not in the closed position 40 (e.g., the lid 36 is in the open position 38), then the method 200 proceeds to a step 218. At the step 218, the controller 96 deactivates the ultraviolet LEDs 42. After the step 218, the method 200 returns to the step 204. However, if at the step 216 the controller 96 determines that the lid 36 is in the closed position 40, then the method 200 proceeds to a step 220.

At the step 220, the controller 96 determines whether the ultraviolet LEDs 42 have been activated for a predetermined period of time (e.g., 5 minutes). The controller 96 can make this determination via a clock (not illustrated). If at the step 220 the controller 96 determines that the ultraviolet LEDs 42 have not yet been activated for the predetermined period of time, then the method 200 returns back to the step 210. However, if at the step 220 the controller 96 determines that the ultraviolet LEDs 42 have been activated for the predetermined period of time, then the method 200 proceeds to a step 222. At the step 222, the controller 96 (i) deactivates the ultraviolet LEDs 42 and (ii) provides notification at the human-machine interface 102, such as by causing the multi-color LED 108 to emit a green color light, that the effort to sanitize the object 30 has concluded.

After the step 222, the method 200 proceeds to a step 224. At the step 224, the controller 96 determines again whether the lid 36 is in the closed position 40. If at the step 224, the controller 96 determines that the lid 36 is not in the closed position 40 (e.g., is in the open position 38), then method 200 proceeds to a step 226. At the step 226, the controller 96 determines whether a predetermined period of time (e.g., 30 seconds) has passed since the lid 36 has been moved away from the closed position 40. If at the step 226 the controller 96 determines that the predetermined period of time has passed since the lid 36 has been moved away from the closed position 40, then the method 200 returns back to the step 204. It should be understood that the steps 202-226 of the method 200 can be performed without the controller 96, such as manually or with some other computing device.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A sanitization apparatus comprising:
a first sanitization module and a second sanitization module facing the first sanitization module, both of the first sanitization module and the second sanitization module comprising:
a backplate comprising a perimeter and a reflective surface;
a housing comprising a wall with an inner surface that extends around the perimeter of the backplate, the wall of the housing comprising an upper portion and a lower portion that opposes the upper portion;
an upper plurality of LEDs disposed on the inner surface of the upper portion of the wall of the housing, each of the upper plurality of LEDs configured to emit ultraviolet light;
a lower plurality of LEDs disposed on the inner surface of the lower portion of the wall of the housing, each of the lower plurality of LEDs configured to emit ultraviolet light; and
a cover attached to the housing, the cover (i) substantially transparent to the ultraviolet light that the upper plurality of LEDs and the lower plurality of LEDs are configured to emit, (ii) together with the backplate and the housing, encapsulating the upper plurality of LEDs and the lower plurality of LEDs, and (iii) comprising a cover surface facing generally away from the reflective surface of the backplate,
wherein, the cover surface of the first sanitization module and the cover surface of the second sanitization module (i) oppose each other and (ii) together partially define a chamber to accept an object to be sanitized with the ultraviolet light that the upper plurality of LEDs and the lower plurality of LEDs are configured to emit, and
wherein, the reflective surface of the backplate is substantially reflective of the ultraviolet light that the upper plurality of LEDs and the lower plurality of LEDs are configured to emit.

2. The sanitization apparatus of claim 1, wherein
for both the first sanitization module and the second sanitization module, each of the upper plurality of LEDs and each of the lower plurality of LEDs comprises a die that (i) is configured to emit the ultraviolet light, at least a portion of which reflects off of the reflective surface of the backplate, through the cover, and into the chamber and (ii) comprises a primary surface that defines a plane that extends into the chamber.

3. The sanitization apparatus of claim 2, wherein
for both the first sanitization module and the second sanitization module, the reflective surface of the backplate defines a plane that intersects with the planes that the primary surfaces of the dies of the upper plurality of LEDs and the lower plurality of LEDs define.

4. The sanitization apparatus of claim 3, wherein
for both the first sanitization module and the second sanitization module, the plane that the reflective surface of the backplate defines is substantially perpendicular to the planes that the primary surfaces of the dies of the upper plurality of LEDs and the lower plurality of LEDs define.

5. The sanitization apparatus of claim 1 further comprising:
a floor that provides a surface that at least partially defines the chamber, along with the cover surface of the first sanitization module and the cover surface of the second sanitization module, the floor configured to support the object to be sterilized from below the object;
wherein, the lower plurality of LEDs of both of the first sanitization module and the second sanitization modules is disposed elevationally above the floor.

6. The sanitization apparatus of claim 5 further comprising:
opposing side walls extending upward from the floor, each of the opposing side walls comprising a surface that further defines the chamber.

7. The sanitization apparatus of claim 1 further comprising:

a lid that provides selective access to the chamber, the lid movable to, from, and between (i) an open position where the lid allows access into the chamber and (ii) a closed position where the lid denies access into the chamber.

8. The sanitization apparatus of claim 7 further comprising:
a lock engageable with the lid to prevent the lid from moving away from the closed position to the open position.

9. The sanitization apparatus of claim 2, wherein, for both the first sanitization module and the second sanitization module,
each of the primary surfaces of the dies of the first upper plurality of LEDs shares a plane substantially in common;
each of the primary surfaces of the dies of the first lower plurality of LEDs shares a plane substantially in common;
each of the primary surfaces of the dies of the second upper plurality of LEDs shares a plane substantially in common; and
each of the primary surfaces of the dies of the second lower plurality of LEDs shares a plane substantially in common.

10. The sanitization apparatus of claim 1, wherein for both the first sanitization module and the second sanitization module,
each LED of the first lower plurality of LEDs faces one of the LEDs of the first upper plurality of LEDs; and
each LED of the second lower plurality of LEDs faces one of the LEDs of the second upper plurality of LEDs.

11. The sanitization apparatus of claim 1, wherein, for both the first sanitization module and the second sanitization module,
the reflective surface of the backplate is oriented to form an angle of 10 degrees or less from vertical.

12. A vehicle comprising:
an interior;
a body that separates the interior from an environment external to the vehicle; and
the sanitization apparatus of claim 1 disposed within the interior.

13. The vehicle of claim 12 further comprising:
a center console disposed within the interior, the center console comprising the sanitization apparatus.

14. The vehicle of claim 12 further comprising:
a seating assembly disposed within the interior and disposed adjacent the sanitization apparatus.

15. The vehicle of claim 12 further comprising:
an armrest disposed within the interior,
wherein, the sanitization apparatus is disposed under the armrest.

16. The vehicle of claim 12, wherein
for both the first sanitization module and the second sanitization module, each of the upper plurality of LEDs and each of the lower plurality of LEDs comprises a die that (i) is configured to emit the ultraviolet light, at least a portion of which reflects off of the reflective surface of the backplate, through the cover, and into the chamber and (ii) comprises a primary surface that defines a plane that extends into the chamber.

17. The vehicle of claim 12 further comprising:
a floor that provides a surface that at least partially defines the chamber, along with the cover surface of the first sanitization module and the cover surface of the second sanitization module, the floor configured to support the object to be sterilized from below the object;
wherein, the lower pluralities of LEDs of both of the first sanitization module and the second sanitization modules are disposed elevationally above the floor.

18. The vehicle of claim 17 further comprising:
opposing side walls extending upward from the floor, each of the opposing side walls comprising a surface that further defines the chamber.

19. The vehicle of claim 12 further comprising:
a lid that provides selective access to the chamber, the lid movable to, from, and between (i) an open position where the lid allows access into the chamber and (ii) a closed position where the lid denies access into the chamber.

20. A vehicle comprising:
an interior;
a body that separates the interior from an environment external to the vehicle; and
the sanitization apparatus of claim 1 disposed to be available for use from the environment external to the vehicle.

* * * * *